United States Patent

[11] 3,625,942

[72] Inventors: Albrecht Edenhofer, Riehen; Hans Spiegelberg, Basel, both of Switzerland
[21] Appl. No.: 714,320
[22] Filed: Mar. 19, 1968
[45] Patented: Dec. 7, 1971
[73] Assignee: Hoffmann-La Roche Inc., Nutley, N.J.
[32] Priority: Mar. 23, 1967
[33] Switzerland
[31] 4246/67

[54] 3A,12B-DIHYDRO-8H-DIBENZO[3,4,6,7]CYCLOHEPT[1,2-D]OXAZOL-8-ONES
20 Claims, No Drawings

[52] U.S. Cl. .................................................. 260/247.5 R, 260/247.1, 260/247.2 R, 260/268 PC, 260/293 R, 260/293.4 A, 260/293.4 C, 260/294.7 C, 260/307 C, 260/307 D
[51] Int. Cl. ........................................................ C07d 99/00

[50] Field of Search .......................................... 260/307.4, 247.5 R, 268 PC, 293.4 A, 307.1, 294.7 C

[56] References Cited
UNITED STATES PATENTS
3,478,048  11/1969  Edenhofer et al. ........... 260/307.4

Primary Examiner—Nicholas S. Rizzo
Assistant Examiner—Anne Marie T. Tighe
Attorneys—Samuel L. Welt, Jon S. Saxe, William H. Epstein, Gerald S. Rosen, Bernard S. Leon and William G. Isgro ABSTRACT: 3a,12b-dihydro-8H-dibenzo[3,4,6,7]cyclohept[1,2,-d]oxazol-8-ones having at the 2-position an alkylated amino group and 2,3,3a,12b-tetrahydro-8H-dibenzo[3,4,6,7]cyclohept[1,2-d]oxazol-8-ones having at the 2-position an alkylated imino group are prepared, inter alia, by reacting a corresponding dibenzo-cyclohept-oxazole compound having at the 2-position an unsubstituted amino, an alkyl substituted mercapto, an unsubstituted imino or a thioxo group, with an appropriate amine. The compounds of the invention are useful, for example, as antidepressant agents.

3A,12B-DIHYDRO-8H-DIBENZO[3,4,6,7]CYCLOHEPT[1,2-D]OXAZOL-8-ONES

BRIEF DESCRIPTION OF THE INVENTION

The invention relates to dibenzocycloheptene compounds of the formula

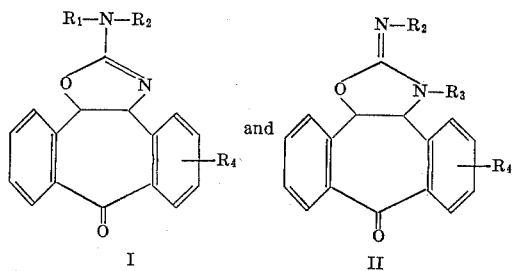

Wherein $R_1$ is hydrogen or alkyl; $R_2$ is alkyl, alkenyl or cycloalkyl; $R_1$ and $R_2$ taken together with the nitrogen atom are a heterocyclic residue; $R_3$ is hydrogen, alkyl, alkenyl or cycloalkyl; and $R_4$ is hydrogen, halogen, alkyl, trifluoromethyl or acyl, as well as the corresponding ketals and the pharmaceutically acceptable acid addition salts thereof. The compounds of formula I and II are useful antidepressant agents.

DETAILED DESCRIPTION OF THE INVENTION

The invention relates to dibenzocycloheptenes of the formulas:

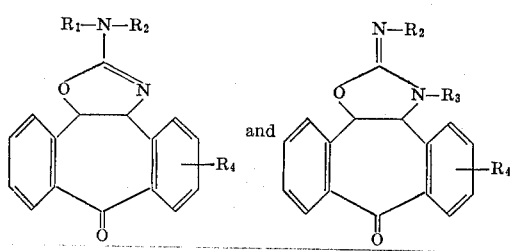

wherein $R_1$ is hydrogen or alkyl; $R_2$ is alkyl, alkenyl or cycloalkyl; $R_1$ and $R_2$ taken together with the nitrogen atom are a heterocyclic residue; $R_3$ is hydrogen, alkyl, alkenyl or cycloalkyl; and $R_4$ is hydrogen, halogen, alkyl, trifluoromethyl or acyl, as well as the corresponding ketals and the pharmaceutically acceptable acid addition salts thereof.

As used herein, the term "alkyl" is to be understood preferably to mean a straight or branched chain lower alkyl group of one to seven carbon atoms, such a methyl, ethyl, isopropyl, butyl, pentyl, heptyl and the like. The term "alkenyl" is to be understood to mean preferably a straight or branched lower alkenyl group having from two to seven carbon atoms such as allyl, butenyl, hexenyl and the like. The term "cycloalkyl" is to be understood to mean unsubstituted or lower alkyl substituted cycloalkyl of three to 12 carbon atoms, preferably three to six carbon atoms, such as, cyclopropyl, cyclobutyl, cyclopentyl and cyclohexyl. The term "halogen" includes chlorine, bromine, fluorine and iodine, preferably chloride and bromine. The term "acyl" is to be understood to mean preferably alkanoyl or alkylsulfonyl of one to seven carbon atoms such as acetyl, methyl sulfonyl and the like. The term "heterocyclic residue" is to be understood to mean a five or six member heterocyclic residue such as piperidyl, piperazinyl or morpholinyl.

Compounds of this invention corresponding to formula I are exemplified by the following:

2-(Methylamino)-3a,12b-dihydro-8H-dibenzo [3,4,6,7]cyclohept [1,2-d]oxazol-8-one;

2-(Ethylamino)-3a,12b-dihydro-8H-dibenzo [3,4,6,7,]cyclohept[1,2-d]oxazol-8-one;

2-(Butylamino)-3a,12b-dihydro-8H-dibenzo [3,4,6,7]cyclohept[1,2-d]oxazol-8One;

2-(Allylamino)-3a,12b-dihydro-8H-dibenzo [3,4,6,7]cyclohept[1,2-d]oxazol-8-one;

2-(Cyclopropylamino)-3a,12b-dihydro-8H-dibenzo[3,4,6,7]cyclohept[1,2-d]oxazol-8-one;

2-(Propylamino)-3a,12b-dihydro-8H-dibenzo[3,4,6,7]cyclohept[1,2-d]oxazol-8-one;

2-(Isopropylamino)-a,12b-dihydro-8H-dibenzo[3,4,6,7]cyclohept[1,2-d]oxazol-8-one;

2-(Dimethylamino)-3a,12b-dihydro-8H-dibenzo[3,4,6,7]cyclohept[1,2-d]oxazol-8one;

2-(4-Methyl-1-piperazinyl)-3a,12b-dihydro-8H-dibenzo[3,4,6,7,]cyclohept[1,2-d]oxazol-8-one;

2-(Morpholinyl)-3a,12b-dihydro-8H-dibenzo [3,4,6,7]cyclohept[1,2-d]oxazol-8-one; and the like.

Compounds of this invention corresponding to formula II are exemplified by the following:

2-(Methylimino-2,3,3a,12b-tetrahydro-3methyl-8H-dibenzo[3,4,6,7]cyclohept[1,2-d]oxazol-8one;

2-(Ethylimino)-2,3,3a,12b-tetrahydro-3methyl-8H-dibenzo[3,4,6,7]cyclohept[1,2,-d oxazol-8-one;

2-(Methylimino)-2,3,3a,12b-tetrahydro-3cyclopropyl-8H-dibenzo[3,4,6,7]cyclohept[1,2-d]oxazol-8-one;

2-(Methylimino)-2,3,3a,12b-tetrahydro-3-isopropyl-8H-dibenzo[3,4,6,7 ]cyclohept[1,2-d]oxazol-8-one;

2-(Methylimino-2,3,3a,12b-tetrahydro-3-8H-dibenzo[3,4,6,7cyclohept[1,2-d]oxazol-8-one; and the like.

The dibenzocycloheptenes of the invention can be prepared utilizing several alternate procedures, for example:

1. A compound of the formula

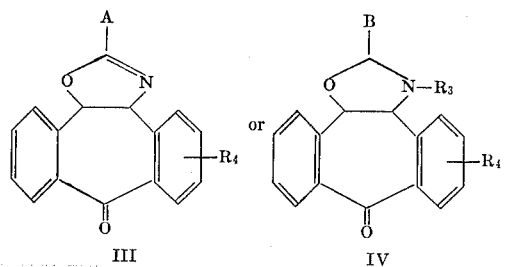

wherein $R_3$ and $R_4$ are as previously described, A is amino or alkyl-substituted mercapto, and B is imino or thioxo, or the corresponding ketal of said compound can be reacted, when $R_3$ is hydrogen, with an amine of the formula

wherein $R_1$ and $R_2$ are previously described, or when $R_3$ is alkyl, alkenyl or cycloalkyl with an amine of the formula $$H_2N-R_2 \quad VI$$

wherein $R_2$ is as previously described; or

2. A compound of the formula

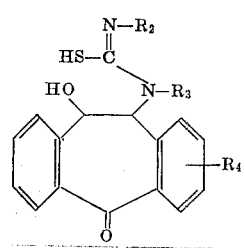

wherein $R_2$, $R_3$ and $R_4$ are as previously described, or the corresponding ketal can be cyclized, with the formation of the oxazolidine ring, and the oxazoles obtained can be N-alkylated, if desired. The compounds of formula I or II obtained can be ketalized and/or converted into pharmaceutically acceptable acid addition salt, if desired.

The optionally ring-substituted compounds of formula III or IV which can be utilized as starting compounds can be produced from the optionally ring-substituted 10, 11-epoxy-10,11-dihydro-5H-dibenzo[a,d]cyclohepten-5-ones by amination with ammonia or a monoalkyl-substituted amine.

The 10-hydroxy-11-amino[or alkylamino]10,11-dihydro-5 H-dibenzo[a,d]cyclohepten-5-ones obtained, which exist in the trans form, may be cyclized by treatment with a cyanogen halide such as, for example, cyanogen bromide, to yield compounds of formula III or IV wherein A is the amino group, and B is the imino group, or by treatment with carbon disulfide to yield compounds of formula III or IV wherein A is the mercapto group, and B is the thioxo group.

The optionally ring-substituted 10,11-epoxy-10,11-dihydro-5H-dibenzo[a,d]cyclohepten-5-ones are known compounds or can be prepared in an analogous manner as known compounds.

The starting compounds of formula III or IV may be reacted with amines or formula V or VI in a known manner. An excess of the amine is conveniently employed.

Compounds of formula III or IV, wherein A is an amino group and B is an imino group, may also be reaminated in the absence of a solvent. The reaction can be accelerated with slight heating, for example, at about 40°–60° C. When volatile amines are employed it is preferable to work in a closed system.

The starting compounds of formula III Or IV wherein A is a mercapto group and B is a thioxo group may be aminated as set out hereinbefore. A solvent, preferably an alkanol such as methanol, can be advantageously utilized. Also, this amination is advantageously carried out at an elevated temperature, preferably at the boiling temperature of the reaction mixture.

Compounds of formula III wherein A is an alkylmercapto group may also be reacted with amines of formula V or VI in the manner described above. The corresponding starting compounds of formula III can be prepared by alkylation of the mercapto group, for example, by treatment with an alkylating agent, such as, methyl iodide.

The optionally ring-substituted compounds of formula VII used as starting compounds can be obtained from the aforesaid 10-hydro-11-amino-10,11-dihydro-5H-dibenzo[a,b] cyclohepten-5-ones by reaction with an N-alkyl-, N-aklkenyl- or N-cycloalkyl-substituted isothiocyanate. The reaction can be carried out at a temperature in the range of room temperature and the boiling point of the reaction mixture. The reactants are advantageously reacted in the presence of an inert solvent, preferably in the presence of an alkanol such as ethanol or an ether such as dioxane.

The readily crystallizable thioureas of formula VII may easily by cyclized with the formation of the oxazolidine ring. This cyclization can advantageously be carried out with the aid of a hydrogen sulfide binding agent, for example, with the aid of an oxidizing agent, for example, a metal oxide, such as, mercury oxide, lead oxide or the like, or by treatment with an alkylating agent, for example, an alkyl halide, such as methyl iodide or the like, with the cleavage of alkyl mercaptan. Advantageously, the reaction can be carried out in the presence of a polar solvent, such as ethanol. The cyclization proceeds particularly smoothly at an elevated temperature, preferably at the boiling temperature of the reaction mixture.

Compounds of formula II wherein $R^2$ and $R^4$ are previously described and $R^3$ is hydrogen, can be alkylated with an alkylating agent, for example, an alkyl halide, such as, methyl iodide, under mild conditions in the presence of a polar solvent. The alkylation proceeds particularly smoothly at room temperature with an excess of the alkylating agent in the presence of a strongly polar solvent, such as, dimethylformamide.

The compounds of formulas I and II, which usually exist in the trans form, of which 2-(methylamino)-, 2-(dimethylamino)-, 2-(ethylamino)-, 2-(allylamino)- and 2-(cyclopropylamino)-3a, 12b-dihydro-8H-dibenzo[3,4,6,7]cyclohept[1,2-d]-oxazol-8-one, 2-(4-methyl-1-piperazinyl)-3a,12b-dihydro-8H-dibenzo[3,4,6,7] cyclohept[1,2-d]oxazol-8-one, as well as 2-(ethylimino)-2,3,3a,12b-tetrahydro-3methyl-8H-dibenzo[3,4,6,7]cyclohept[1,2-d]oxazol-8-one represent particularly valuable substances, can be ketalized in a known manner, for example, by the action of lower alkanols or glycols, preferably by treatment with methanol or ethyleneglycol.

The compounds of formulas I and II form acid addition salts with pharmaceutically acceptable inorganic and organic acids; for example, with hydrohalic acids, such as, hydrochloric acid, with other mineral acids, such as, sulfuric acid, phosphoric acid, nitric acid, and with organic acids, such as, tartaric acid, citric acid, oxalic acid, camphorsulfonic acid, salicylic acid, ascorbic acid, maleic acid, mandelic acid and the like. Preferred salts are the hydrochlorides. The pharmaceutically acceptable acid addition salts are preferably prepared in an inert solvent by treatment of the free base with the corresponding acid.

The compounds of formulas I and II, their corresponding ketals, and their pharmaceutically acceptable acid addition salts possess psychopharmacological antidepressant activity and are therefore useful as psychopharmacological antidepressants. Moreover, the compounds of formulas I and II, and their salts, possess the advantage of being devoid of certain undesirable effects, for instance, they are substantially free of anticholinergic activity. Their useful psychopharmacological antidepressant activity is demonstrated in warm-blooded animals utilizing standard procedures. For example, groups comprising 10 mice each are administered the test substance in variable amounts subcutaneously. After 16 hours, they are given subcutaneously 5 mg./kg. of 2-hydroxy-2-ethyl-3-isobutyl-9,10-dimethoxyl-1,2,3,4,6,7,-hexahydro-11bH-benzyl[a]quinolizine (substance A), and 30 minutes thereafter, they are given intraperitoneally 3.75 mg./kg. of ethanol. A control group of 10 animals is given only ethanol. The duration of sleep is measured in all animals. The percentage decrease in duration in sleep in comparison with the duration of the substance A potentiated sleep reflects the psychopharmacological antidepressant effect.

When 2-(dimethylamino)-3a,12b-dihydro-8H-dibenzo[3,4,6,7]cyclohept[1,2-d]oxazol-8-one which has demonstrated an $LD_{50}$ of, for example 180 mg./kg. p.o. in mice, is utilized as the test substance at dosages in the range of 10–20 mg./kg. s.c., a corresponding 33–52 percent decrease in duration of sleep is produced.

When 2-(ethylimino)-2,3,3a,12b-tetrahydro-3-methyl-8H-dibenzo[3,4,6,7]cyclohept[1,2-d]oxazol-8-one, which has demonstrated an $LD_{50}$ of, for example, 350 mg./kg. p.o. in mice, is utilized as the test substance at a dose of 20 mg./kg. s.c., a corresponding 45 percent decrease in duration of sleep is produced.

The substantial absence of anticholinergic effect is demonstrated in rabbits. Pilocarpine is administered to urethane narcotized rabbits and their saliva drippings are collected in a measuring cylinder over a period of 15 minutes. Immediately thereafter, they are given 1,3 or 6 mg./kg. i.v. of the substance to be evaluated, and their saliva drippings are collected in a measuring cylinder over a period of 15 minutes. The saliva drippings of controls are also collected over two successive periods of 15 minutes each. The anticholinergic effect is reported as the percent inhibition of salivation taken in relation to the saliva production before the administration of the test substance. When 2-(dimethylamino) -3a, 12b-dihydro-8H-dibenzo [3,4,6,7]cyclohept [1,2-d]oxazol-8-one is administered in the range of 1–6 mg./kg. i.v., a corresponding 18 to 38 percent inhibition of salivation is produced. When 2-(methylamino)-3a 12b -dihydro-8H-dibenzo [3,4,6,7] cyclohept [1,2-d]oxazol-8-one is administered at a dose of 3mg./kg. i.v., a corresponding 7 percent inhibition of salivation is produced. These are much lower than the inhibition obtained with standard psychopharmacological antidepressants such as amitriptyline.

The compounds of formulas I and II and their pharmaceutically acceptable acid addition salts have effects qualitatively similar to those of amitriptyline, known for its therapeutic uses and properties. Thus, the compounds of this invention demonstrate a pattern of activity associated with psychopharmacological antidepressants of known efficacy and safety.

The compounds of formulas I and II can be used as medicaments, for example, in the form of pharmaceutical preparations which contain them or their salts or ketals in admixture with a pharmaceutical, organic or inorganic inert carrier material suited for eternal or parenteral application, such as, for example, water, gelatin, gum arabic, lactose, starch, magnesium stearate, talc, vegetable oils, polyalkyleneglycols, and the like. The pharmaceutical preparations can be in solid form, for example, as tablets, dragees, suppositories, capsules or in liquid form, for example, as solutions, suspensions or emulsions. They may be sterilized and may contain additives, such as preserving, stabilizing, wetting or emulsifying agent, salts for varying the osmotic pressure or buffers. They may also contain other therapeutically valuable substances.

A suitable pharmaceutical dosage unit contains from about 0.1 to 5 mg. of a compound of formula I or II or an equivalent amount of a pharmaceutically acceptable acid addition salt thereof. Suitable oral dosage regimens in warm-blooded mammals comprise from about 0.1 mg./kg. per day to about 5 mg./kg. per day. Suitable parenteral dosage regimens in warm-blooded mammals comprise from about 0.05 mg./kg. per day to about 2.5 mg./kg. per day. However, for any particular subject, the specific dosage regimen should be adjusted according to individual need and the professional judgement of the person administering or supervising the administration of a compound of formula I or II. It is to be understood that the dosages set forth herein are exemplary only and that they do not, to any extent, limit the scope or practice of this invention.

The following nonlimiting examples further illustrate the invention. All temperatures are in degrees centigrade, unless otherwise mentioned.

EXAMPLE 1

Preparation of racemic trans-2-(2-methylamino) -3a,12b-dihydro-8H-dibenzo[3,4,6,7]cyclohept[1,2-d]oxazol-8-one 3 g. of racemic trans-2-amino-3a,12b-dihydro-8H-dibenzo[3,4,6,7]cyclohept[1,2-d]oxazol -8-one were treated with 40 ml. of a 20 percent w/v solution of methylamine in ethanol and heated at 90° C. in a closed system under a nitrogen atmosphere at 20 atmospheres gauge pressure for 4 hours. The reaction mixture was subsequently evaporated under reduced pressure. The residual racemic trans 2-(2-methyl-amino)-3a,12b-dihydro-8H-dibenzo[3,4,6,7]cyclohept[1,2-d]oxazol-8-one was taken up in ether and treated with 30 percent methanolic hydrochloric acid up to the congo-acidic reaction, whereupon the hydrochloride salt precipitated. After recrystallization from methanol/ether, the racemic trans-2-(2-methylamino)-3a,12b-dihydro-8H-dibenzo[3,4,6,7]cyclohept[1,2-d ]oxazol-8-one hydrochloride had a melting point of 250° C.

EXAMPLE 2

Preparation of racemic 2-(methylamino)-3a, 12b-dihydro-8H-dibenzo[3,4,6,7]cyclohept[1,2-d]oxazol-8-one hydrochloride 23.2 g. of racemic 3-methyl-1(trans-10,11 -dihydro-11-hydroxy -5oxo-5H-dibenzo[a,d]cyclohepten-10-y1)-2-thiourea were heated under reflux conditions with intensive stirring for 18 hours together with 1000 ml. of absolute ethanol and 116 g. of mercuric oxide. The resulting solution was subsequently filtered over activated carbon, concentrated to about 200 ml. and treated with 30 percent methanolic hydrochloric acid up to the congo-acidic reaction. The racemic trans-2-(methylamino)-3a, 12b-dihydro-8H-dibenzo[ 3,4,6,7]cyclohept[1,2-d]oxazol-8-one hydrochloride which precipitated (crystalline) had a melting point of 250°–251° C. (dec.).

The racemic 3-methyl-1-(trans-10,11-dihydro-11-hydroxy-5-oxo -5H-dibenzo[a,d]cyclohepten-10-yl)-2thiourea employed as the starting compound was, for example, prepared as follows:

30 g. of racemic trans-10-hydroxy-11-amino-10,11-dihydro-dibenzo[a,d]cyclohepten-5-one were dissolved in 600 ml. of absolute dioxane. The solution was treated dropwise at 20° C. with a solution containing 10 g. of methyl isothiocyanate in 50 ml. of absolute dioxane with stirring for a period of 12 hours. The racemic 3-methyl-1-(trans-10,11-dihydro-11-hydroxy-5-oxo-5H-dibenzo[a,d]cyclohepten-10-yl)-2-thiourea which precipitated had a melting point of 129°–130°C.

By the same procedure as is described in detail in this example, the following compounds were prepared:

Racemic trans-2-(ethylamino)-3a,12b-dihydro-8H-dibenzo[
3,4,6,7]cyclohept[1,2-d]oxazol-8-one, having a melting point of 198°–199° C., the corresponding hydrochloride melting at 239°C. (dec.) [from racemic 3-ethyl-1-(Trans-10,11-dihydro-11-hydroxy-5-oxy-5H-dibenzo[a,d] cyclohepten-10-yl)-2-thiourea];

Racemic trans-2-(propylamino)-3a, 12b-dihydro-8H-dibenzo[
3,4,6,7]cyclohept[1,2-d]oxazol-8-one, having a melting point of 125°–127° C., the corresponding hydrochloride melting at 208°–210° C., (dec.) [from racemic 3-propyl-1-(trans-10,11-dihydro- 11-hydroxy-5-oxo- 5H-dibenzo[a,d]cyclohepten-10-yl)-2-thiourea];

Racemic trans-2-(isopropylamino)-3a, 12b-dihydro-8H-dibenzo[
3,4,6,7]cyclohept[1,2-d]oxazol-8-one, having a melting point of 174°–176° C., the corresponding hydrochloride having a melting point of 206°–207° C., (dec.) [from racemic 3-isopropyl-1(trans-10,11-dihydro-11-hydroxy-5-oxo-5H-dibenzo[a,d]cyclohepten-10-yl)-2-thiourea];

Racemic trans-2-(butylamino)-3a, 12b-dihydro-8H-dibenzo[
3,4,6,7]cyclohept[1,2-d]oxazol-8-one, isolated as the corresponding hydrochloride having a melting point of 211° C., (dec.) [from racemic 1-butyl-3-(trans- 10,11 - dihydro-11-hydroxy-5-oxo-5H-dibenzo[a,d]cyclohepten-10-yl)-2-thiourea];

Racemic trans-2-(allylamino)-3a,12b-dihydro-8H-dibenzo[
3,4,6,7]cyclohept[1,2-d]oxazol-8-one, having a melting point of 123°–125° C., the corresponding hydrochloride having a melting point of 200°–201° (dec.) [from racemic 1-allyl-3-(trans-10,11-dihydro-11-hydroxy-5-oxo-5H-dibenzo[a,d]cyclohepten-10-yl)-2-thiourea].

EXAMPLE 3

Preparation of racemic trans-2-(dimethylamino)-3a,12b-dihydro-8H-dibenzo[3,4,6,7]cyclohept[1,2-d]oxazol-8-one 6.2 g. of racemic trans-2-amino-3a,12b-dihydro-8H-dibenzo[3,4,6,7]cyclohept[1,2-d]oxazol -8-one were treated with 120 ml. of a 20 percent w/v solvent of dimethylamine in ethanol and heated at 90° C. in a closed system under a nitrogen atmosphere at 5 atmospheres gauge pressure for 4 hours. The reaction mixture was subsequently evaporated under reduced pressure, an the residue was taken up in 2-N hydrochloric acid. The resulting solution was washed with ether, filtered over activated carbon and made basic by addition of concentrated ammonia. The racemic trans-2-(dimethylamino)-3a,12b-dihydro-8H-dibenzo[3,4,6,7 ]cyclohept[1,2-d]oxazol-8-one which precipitated had a melting point of 158°–159° C., The hydrochloride prepared from the base by treatment with 30 percent methanolic hydrochloric acid had a melting point of 238°–240° C.

The following compound was also prepared by the process described in this example:

Racemic trans-2-(4-methyl-1-piperazinyl)-3a,12b-dihydro-8H-
H-dibenzo[3,4,6,7]cyclohept[1,2-d]oxazol-8-one, the corresponding hydrochloride having a melting point of 214° C. (dec.) [from racemic trans-2-amino-3a,12b-dihydro-8H-dibenzo[3,4,6,7]cyclohept[1,2-d]oxazol-8-one and N-methylpiperazine].

EXAMPLE 4

Preparation of racemic trans-2-(dimethylamino)-3a,12b-dihydro-8H-dibenzo[3,4,6,7]cyclohept[1,2-d]oxazol-8-one 5 g. of racemic trans 2,3,3a, 12b-tetrahydro-2Thioxo-8H-dibenzo[3,4,6,7cyclohept[1,2-d]oxazol-8-one were heated under reflux conditions at 63°C. under a nitrogen atmosphere for 1 hour with 25 ml. of absolute methanol and 25 ml. of dimethylamine. The reaction mixture was subsequently evaporated, and the residue was taken up in 2–N hydrochloric acid. The solution was washed with ether and made alkaline by the addition of concentrated ammonia. The racemic trans-2-(2-dimethylamino)-3a, 12b-dihydro-8H-dibenzo[3,4,6,7]cyclohept[1,2-d]oxazol-8-one which precipitated was dissolved in methylene chloride. The resulting solution was dried under sodium sulfate and evaporated under reduced pressure. After recrystallization from methanol, the base had a melting point of 158°–159° C. The base was dissolved in ether and treated with 30 percent methanolic hydrochloric acid to yield the corresponding hydrochloride having a melting point of 238°–240° C.

The racemic trans- 2,3,3a, 12b-tetrahydro-2-thioxo-8H-dibenzo[3,4,6,7cyclohept[1,2-d]oxazol 8-one employed as the starting compound was, for example, prepared as follows:

27.5 g. of racemic trans-10-hydroxy-11-amino-10,11 - dihydro- 5H-dibenzo[a,d]cyclohepten-5-one, 200 ml. of ethanol and 70 ml. of water were brought to a boil. Thereafter, 11g. of trithiocarbonate acid were quickly added. After applying strong reflux conditions, the mixture was allowed to reflux with stirring for 18 hours. Then, 4 ml. of concentrated hydrochloric acid were added, and the mixture was reacted for an additional hour. Thereafter, the reaction mixture was stirred for 12 hours in a cool place, and the resulting crystalline precipitate was removed by filtration. The crystalline material was washed with about 150 ml. of ethanol/water to yield racemic trans-2,3,3a,12b-tetrahydro-2-thioxo-8H-dibenzo[3,4,6,7]cyclohept[1,2-d]oxazol-8-one having a melting point of 226°–229° C.

By the same procedure as is described in detail in this example, the following compounds were prepared:

Racemic trans-2-(4-methyl-1-piperazinyl)-3a,12b-dihydro-8
H-dibenzo[3,4,6,7]cyclohept[1,2-d]oxazol-8-one
hydrochloride, having a melting point of 214° C. (dec.) [from racemic trans-2,3,3a,12b-tetrahydro-2-thioxo-8H-dibenzo[3,4,6,7]cyclohept[1,2-d]oxazol-8-one and N-methylpiperazine]; and Racemic trans-2-morpholino-3a, 12b-dihydro-8H-dibenzo [3,4,6,7]
cyclohept[1,2-d]oxazol-8-one hydrochloride having a melting point of 219°–220° C. [from racemic trans-2,3,3a,12b-tetra-hydro-2-thioxo-8H-dibenzo[3,4,6,7]cyclohept[1,2-d]oxazol-8-one and morpholine.

EXAMPLE 5

Preparation of racemic trans-2-(dimethylamino)-3a,12b-dihydro-8H-dibenzo[3,4,6,7]cyclohept[1,2-d]oxazol-8-one 1.5 g. of racemic trans-3a,12b-dihydro-2-methylthio-8H-dibenzo[3,4,6,7]cyclohept[1,2-d]oxazol-8-one were heated to a boil with 130 ml. of ethanol and 20 ml. of dimethyl sulfoxide, treated dropwise with stirring with 23 ml. of dimethyl sulfoxide, treated dropwise with stirring with 23 ml. of dimethylamine and 150 ml. of ethanol/dimethylformamide, and stirred at reflux conditions for 18 hours. The reaction mixture was subsequently evaporated under reduced pressure and the residue was taken up in 2-N hydrochloride acid. The resulting solution was washed with ether and made alkaline by the addition of concentrated ammonia. The racemic trans-2-(dimethylamino)-3a,12b-dihydro-8H-dibenzo[3,4,6,7 ]cyclohept[1,2-d]oxazol -8-one which precipitated can be converted into the hydrochloride, (which has a melting point of 239° C.) as described in example 4.

The racemic trans-3a,12b-dihydro-2-methylthio-8H-dibenzo[3,4,6,7]cyclohept[1,2-d]oxazol-8-one employed as the starting compound was, for example, prepared as follows:

2.5 g. of racemic trans-2,3,3a,12b-tetrahydro-2-thioxo-8H-dibenzo[3,4,6,7]cyclohept[1,2-d]oxazol-8-one were dissolved in 25 ml. of 2N sodium hydroxide solution and 25 ml. of ethanol. Thereafter, a solution containing 1 ml. of dimethylsulfate in 10 ml. of ethanol was added with rapid stirring. After a short time, a precipitate formed, which was removed by filtration, washed with water and dried under reduced pressure. After recrystallization of the precipitate from ethanol, there was obtained racemic trans-3a, 12b-dihydro-2-methylthio-8H-dibenzo[3,4,6,7]cyclohept[1,2-d]oxazol-8-one having a melting point of 151° C.

EXAMPLE 6

Preparation of racemic trans-2-(cyclopropylamino)-3a,12b-dihydro-8H-dibenzo[3,4,6,7]cyclohept[1,2-d]oxazol-8-one hydrochloride 0.7 g. of racemic 3-cyclopropyl-1(trans-10,11-dihydro-11-hydroxy 5-oxo-5H-dibenzo[a,d]cyclohepten-10-yl)-2-thiourea was heated under reflux conditions for 5 hours with 10 ml. of ethanol and 0.45 g. of methyl iodide. The reaction mixture was subsequently evaporated to dryness under reduced pressure. The residue was moistened with a little 3–N ammonium hydroxide and extracted with chloroform. The racemic trans-2-(cyclopropyl-amino)-3a,12b-dihydro-8H-dibenzo[3,4,6,7 ]cyclohept[1,2-d]oxazol-8-one hydrochloride which was prepared from the oily base remaining behind after evaporation of the chloroform extract by treatment with methanolic hydrochloric acid, had a melting point of 211°–212° C. (dec.) after recrystallization from ethanol/ether.

The racemic 3-cyclopropyl-1-(trans-10,11-dihydro-11-hydroxy-5-oxo-5H-dibenzo[a,d]cyclohepten-10-yl)-2-thiourea employed as the starting compound was, for example, prepared as follows:

4.8 g. of racemic trans-10-hydroxy-11-amino-10,11-dihydro-dibenzo[a,b]cyclohepten-5-one were suspended in 200 ml. of ethanol, treated with 2.0 g. of cyclopropyl isothiocyanate and heated under reflux conditions for 16 hours. The reaction mixture was subsequently evaporated under reduced pressure, and the residue was treated with 10 ml. of 0.1–N hydrochloric acid. The crude racemic 3-cyclopropyl-1-(trans-10,11-dihydro-11-hydroxy-5-oxo-5H-dibenzo[a,d]cyclopheptan-10-yl)-2-thiourea had a melting point of 207° C. after recrystallization from methanol.

EXAMPLE 7

Preparation of racemic trans-2-(methylimino)-2,3,3a,12b-tetra-hydro-3-methyl -8H-dibenzo[3,4,6,7]cyclohept[1,2-d]oxazol-8-one hydrochloride 1.6 g. of racemic 1-(trans-10,11-dihydro-11-hydroxy-5-oxo-5H-dibenzo[a,d]cyclohepten-10-yl)-1,3-dimethyl-2-thiourea were heated under reflux conditions for 12 hours with 50 ml. of ethyl alcohol and 1.0 g. of methyl iodide. The reaction mixture was subsequently evaporated under reduced pressure and the residue was taken up in chloroform. The chloroform extract was washed with aqueous ammonia, dried over potassium carbonate and evaporated under reduced pressure. The racemic trans-2(methylimino)-2,3,3a,12b-tetrahydro-3-methyl -8H-dibenzo[3,4,6,7]cyclohept[1,2-d]oxazol-8-one hydrochloride prepared from the residual oily base by treatment with methanolic hydrochloric acid had a melting point of 248°–249° C. (dec.) after reprecipitation from absolute ethanol/ether.

The racemic 1-(trans-10,11-dihydro-11-hydroxy-5-oxo-5H-dibenzo[a,d]cyclohepten-10yl)-2,3-dimethyl-2-thiourea employed as starting compound was, for example, prepared as follows:

2.5 g. of racemic trans-10-hydroxy-11-methylamino-10,11-dihydro-dibenzo[a,d]cyclohepten-5-one were suspended in 70 ml. of ethanol and, after the addition of 0.8 g. of methyl isothiocyanate, the mixture was heated under reflux conditions for 6 hours. The racemic 1-(trans-10,11-dihydro-11-hydroxy-5-oxo-5H-dibenzo[a,d]cyclohepten-10-yl)-1,3-dimethyl-2-thiourea which separates out (crystalline) upon cooling the reaction mixture had a melting point of 225° C. (dec.) after recrystallization from ethanol.

By the same procedure as is described in detail in this example, the following compounds were prepared:

Racemic trans-2-(methylimino)-2,3,3a,12b-tetrahydro-3-ethyl-8H-dibenzo[3,4,6,7]cyclohept[1,2-d]oxazol-8-one hydrochloride, having a melting point of 235°–236° C. (dec.) [from racemic 1-ethyl-1-(trans-10,11-dihydro-11-hydroxy-5-oxo-5H-dibenzo[a,d]cyclohepten-10-yl)-3-methyl-2-thiourea];

Racemic trans-2-(ethylimino)-2,3,3a, 12b-tetrahydro-3-methyl-8H-dibenzo[3,4,6,7]cyclohept[1,2-d]oxazol-8-one hydrochloride, having a melting point of 239° C. (dec.) [from racemic 1-methyl-1-(trans-10,11-dihydro-11-hydroxy-5-oxo-5H-dibenzo[a,d]cyclohepten-10-yl)-3-ethyl-2-thiourea];

Racemic trans-2-(methylimino)-2,3,3a,12b-tetrahydro-3-isopropyl-8H-dibenzo[3,4,6,7]cyclohept[1,2-d]oxazol-8-one hydrochloride, having a melting point of 242° C. (dec.) [from racemic 1-isopropyl-1-(trans-10,11-dihydro-11-hydroxy-5-oxo-5H-dibenzo[a,d]cyclohepten-10-yl)-3-methyl-2-thiourea]; and Racemic trans-2-(methylimino)-2,3,3a,12b-tetrahydro-3-cyclopropyl-8H-dibenzo[3,4,6,7]cyclohept[1,2-d]oxazol-8-one hydrochloride, having a melting point of 235° C. (dec.) [from racemic 1-cyclopropyl-1-(trans-10,11-dihydro-11-hydroxy-5-oxo-5H-dibenzo[a,d]cyclohepten-10-yl)-3-methyl-2-thiourea.

EXAMPLE 8

Preparation of racemic trans-2-ethylimino-2,3,3a,12b-tetrahydro-3-methyl-8H-dibenzo[3,4,6,7]cyclohept[1,2-d]oxazol-8-one 13g. of racemic trans-2-ethylamino-3a,12b-dihydro-8H-dibenzo[3,4,6,7]cyclohept[1,2-d]oxazol-8-one, 1.3 g. of methyl iodide and 200 ml. of dimethylformamide were mixed and, with the exclusion of light, allowed to stand at room temperature for 5 days. The reaction mixture formed a clear yellow solution from which the reaction product gradually crystallizes out. The mixture is evaporated under reduced pressure. The residue was taken up in water and extracted with chloroform. The chloroform phase was discarded. The aqueous phase was made alkaline with 1–N caustic soda and exhaustively extracted with chloroform. The chloroform extracts were washed with water, dried over potassium carbonate and evaporated under reduced pressure. The residual racemic trans-2-ethylimino-2,3,3a,12b-tetrahydro-3-methyl-8H-dibenzo[3,4,6,7]cyclohept[1,2-d]oxazol-8-one was taken up in ether and treated with 30 percent methanolic hydrochloric acid up to the congo-acidic reaction. The racemic trans-2-ethylimino-2,3,3a,12b-tetrahydro-3-methyl-8H-dibenzo[3,4,6,7]cyclohept[1,2-d]oxazol-8-one hydrochloride which precipitated had a melting point of 236°–237° C. (dec.) after recrystallization from ethanol/ether.

EXAMPLE 9

Capsule Formulation

| | Per Capsule |
|---|---|
| Racemic trans-2-(dimethylamino)-3a,12b-dihydro-8H-dibenzo[3,4,6,7]cyclohept[1,2-d]oxazol-8-one hydrochloride | 10 mg. |
| mannitol | 110 mg. |
| talcum | 5 mg. |
| | 125 mg. |

The active substance is homogenously mixed with the mannitol and the talcum. The resulting mixture is passed through a No. 5 sieve (mesh width about 0.23 mm.) and again thoroughly mixed. The mixture is filled into size No. 4 gelatin capsules.

EXAMPLE 10

Dragees Formulation

| | |
|---|---|
| Racemic trans-2-(ethylamino)-3a,12b-dihydro-8H-dibenzo[3,4,6,7]cyclohept[1,2-d]oxazol-8-one hydrochloride | 25 mg. |
| mannitol | 100 mg. |
| corn starch | 20 mg. |
| talcum | 5 mg. |
| | 150 mg. |

The active substance mixed with the mannitol and passed through a No. 5 sieve (mesh width about 0.23 mm.). A 10 percent aqueous paste is prepared from the corn starch and homogeneously mixed with the active substance mixed with the mannitol. The moist mass is passed through a No. 3 sieve (mesh width about 1.0 mm.). The granulate is dried and, after addition of the talcum, is pressed into biconvex kernels having a weight of 150 mg. The kernels can be coated in the usual manner by dredging with a sugar layer.

We claim:

1. A compound of the formula

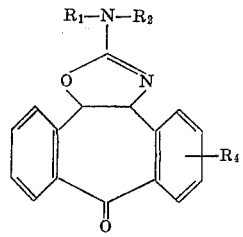

I wherein $R_1$ is selected from the group consisting of hydrogen and lower alkyl of one to seven carbon atoms; $R_2$ is selected from the group consisting of lower alkyl of one to seven carbon atoms, lower alkenyl of two to seven carbon atoms and lower cycloalkyl of three to six carbon atoms; $R_1$ and $R_2$ taken together with the nitrogen are piperidyl, piperazinyl, 4-methyl-piperazinyl or morpholinyl; and $R_4$ is selected from the group consisting of hydrogen, halogen, lower alkyl of one to seven carbon atoms, trifluoromethyl, alkanoyl of one to seven carbon atoms, trifluoromethyl, alkanoyl of one to seven carbon atoms and alkyl-sulfonyl of one to seven carbon atoms, its ketals and pharmaceutically acceptable acid addition salts.

2. A compound according to claim 1, wherein $R_1$ and $R_4$ are hydrogen.

3. A compound according to claim 2, which is the trans stereoisomer.

4. A compound according to claim 3, wherein $R_2$ is lower alkyl of one to seven carbon atoms.

5. A compound according to claim 4, wherein $R_2$ is methyl, i.e., 2-(methylamino)-3a,12b-dihydro-8H-dibenzo[3,4,6,7]cyclohept[1,2-d]oxazol-8-one.

6. A compound according to claim 4, wherein $R_2$ is ethyl, i.e., 2-(ethylamino)-3a,12b-dihydro-8H-dibenzo[3,4,6,7]cyclohept[1,2-d]oxazol-8-one.

7. A compound according to claim 4, wherein $R_2$ is butyl, i.e., 2-(butylamino)-3a,12b-dihydro-8H-dibenzo[3,4,6,7]cyclohept[1,2-d]oxazol-8-one.

8. A compound according to claim 4, wherein $R_2$ is propyl, i.e., 2-(propylamino)-3a,12b-dihydro-8H-dibenzo[3,4,6,7]cyclohept[1,2-d]oxazol-8-one.

9. A compound according to claim 4, wherein $R_2$ is isopropyl, i.e., 2-(isopropylamino)-3a,12b-dihydro-8H-dibenzo[3,4,6,7]cyclohept[1,2-d]oxazol-8-one.

10. A compound according to claim 4, wherein $R_2$ is lower alkenyl of two to seven carbon atoms.

11. A compound according to claim 10, wherein $R_2$ is allyl, i.e., 2(allylamino)-3a,12b-dihydro-8H-dibenzo[3,4,6,7]cyclohept1,2-d]oxazol-8-one.

12. A compound according to claim 3, wherein $R_2$ is lower cycloalkyl of three to six carbon atoms.

13. A compound according to claim 12, wherein $R_2$ is cyclopropyl, i.e., 2(Cyclopropylamino)-3a,12b-dihydro-8H-dibenzo[3,4,6,7]cyclohept[1,2-d]oxazol-8-one.

14. A compound according to claim 4, wherein $R_1$ and 2 together with the nitrogen are piperidyl, piperazinyl, 4-methyl-piperazinyl or morpholinyl.

15. A compound according to claim 14, 2-(4-methyl-1-piperazinyl)-3a,12b-dihydro-8H-dibenzo[3,4,6,7]cyclohept[1,2-d]oxazol-8-one.

16. A compound according to claim 14, 2-(morpholinyl)-3a,12b-dihydro-8H-dibenzo[3,4,6,7]cyclohept[1,2-d]oxazol-8-one.

17. A compound according to claim 1, wherein $R_1$ is lower alkyl of one to seven carbon atoms.

18. A compound according to claim 17, which is the trans stereoisomer.

19. A compound according to claim 18, wherein $R_2$ is lower alkyl of one to seven carbon atoms.

20. A compound according to claim 19, wherein $R_1$ and $R_2$ are methyl, i.e., 2-(diemthylamino)-3a,12b-dihydro-8H-dibenzo[3,4,6,7]cyclohept[1,2-d]oxazol-8-one.

* * * * *